United States Patent [19]

Collier et al.

[11] Patent Number: 5,656,074

[45] Date of Patent: Aug. 12, 1997

[54] PIGMENT WHICH IS SUBSTANTIALLY FREE OF WATER-SOLUBLE SALTS AND CONFERS CORROSION RESISTANCE

[75] Inventors: John Richard Collier, Hendesford; Kenneth Urmston Holker, Kidderminster, both of England

[73] Assignee: Albright & Wilson Limited, Warley, England

[21] Appl. No.: 422,778

[22] Filed: Apr. 17, 1995

Related U.S. Application Data

[63] Continuation of Ser. No. 50,768, Apr. 21, 1993, abandoned, which is a continuation of Ser. No. 394,585, Aug. 16, 1989, abandoned, which is a continuation-in-part of Ser. No. 287,893, Dec. 21, 1988, abandoned.

[30] Foreign Application Priority Data

Aug. 25, 1988 [GB] United Kingdom .................. 8820222
Nov. 11, 1988 [GB] United Kingdom .................. 8826420

[51] Int. Cl.$^6$ .................. C09D 5/08; C09D 1/00
[52] U.S. Cl. .................. 106/454; 106/425; 106/426; 106/441; 106/445; 106/14.21; 106/14.34; 106/453
[58] Field of Search .................. 106/425, 426, 106/14.21, 14.34, 445, 441, 439, 453, 454; 422/8; 252/387

[56] References Cited

U.S. PATENT DOCUMENTS

| | | | |
|---|---|---|---|
| 3,462,514 | 8/1969 | Kurkowski et al. | 525/43 |
| 3,582,379 | 6/1971 | Hackbarth et al. | 106/483 |
| 3,676,385 | 7/1972 | Walus | 523/454 |
| 3,715,328 | 2/1973 | Stapfer et al. | 106/264 |
| 3,899,346 | 8/1975 | Ferrigno | 106/414 |
| 3,969,127 | 7/1976 | Robitaille et al. | 106/425 |
| 4,626,283 | 12/1986 | Martins et al. | 106/14.24 |
| 4,687,595 | 8/1987 | Howes et al. | 252/387 |
| 4,710,404 | 12/1987 | Reichert et al. | 106/14.05 X |
| 4,881,975 | 11/1989 | Collier et al. | 106/14.05 |
| 4,917,820 | 4/1990 | Matsumoto | 252/397 |
| 4,935,058 | 6/1990 | Helmstetter | 381/103 |

FOREIGN PATENT DOCUMENTS

| | | |
|---|---|---|
| 272 142 | 6/1927 | United Kingdom . |
| 641 547 | 8/1950 | United Kingdom . |
| 1 120 854 | 7/1968 | United Kingdom . |
| 1 164 434 | 9/1969 | United Kingdom . |
| 1 432 821 | 4/1976 | United Kingdom . |
| 1 450 916 | 9/1976 | United Kingdom . |
| 1 457 590 | 12/1976 | United Kingdom . |
| 2 166 144 | 4/1986 | United Kingdom . |
| 2 177 098 | 1/1987 | United Kingdom . |
| 2 190 380 | 11/1987 | United Kingdom . |

OTHER PUBLICATIONS

Sax et al., "Hawley's Condensed Chemical Dictionary" 11th edition Van Nostrand Reinhold Company Inc, 1987, p. 23.
N. Irving Sax, *Hawley's Condensed Chemical Dictionary*, 11th ed. (1987; Van Nostrand Rheinhold Company Inc) p. 1255.
Hawley's Condensed Chemical Dictionary 11th ed, p. 669. (1987).
DE 3204143A1 (Gabert et al.) 21 Oct. 1992, see Chem. Ab. 97:218336 only.
JP 02265949A2 (Inoue, Hisamitsu) 30 Oct. 1990, see Chem. Ab. 115:30578 only.
FR 2635784 A1 (Collier, Richard John) 24 Aug. 1990, see Chem. AB. 113:193533 only.
JP 05045090A2 (Yoshida et al) 9 Feb. 1993, see Chem. Ab. 119:15050 only.
CS 235770B1 (Nedorost et al.) 1 Dec. 1986, see Chem. Ab. 108:57938 only.
DE 2460543 (Steinkopf, Bernd) 20 Dec. 1974, see Chem. Ab. 85:129576 only.
DE 2460508 (Steinkopf, Bernd) 20 Dec. 1974, see Chem. Ab. 85:165720 only.
DE 2460509 (Steinkopf, Bernd) 1 Jul. 1976, see Chem. Ab. 85:165719 only.
JP 54081132 (Kinugasa et al.) 13 Dec. 1977, see Chem. Ab. 91:197883 only.
JP 54043933 (Kinugasa et al.) 13 Sep. 1979, see Chem. Ab. 91:111681 only.
JP 54083024 (Kinugasa et al) 14 Dec. 1977, see Chem. Ab. 91:215717 only.
DD 272310A1 (Kuempfel et al.) 4 Oct. 1989, see Chem. Ab. 112:100867 only.
HU 44591 A2 (Lodi et al.) 28 Mar. 1988), see Chem. Ab. 109:165711 only.
JP 02265948A2 (Inoue, Hisamitsu) 7 Apr. 1989, see Chem. Ab. 115:281286 only.
JP 02092968A2 (Jinnai, Masahiro) 29 Sep. 1990, see Chem. Ab. 114:25883 only.
JP 63268767 A2 (Sugimoto et al.) 7 Nov. 1988, see Chem. Ab. 116:204022 only.
DE 34108441 A1 (Passut, John) 29 Nov. 1984, see Chem. Ab. 102:99783 only.
EP 232936 A2 (Huddleston, Elwy G.) 19 Aug. 1987, see Chem Ab. 107:219274 only.
EP 25539 A2 (Yoshida et al.) 25 Mar. 1981; see Chem. Ab. 106:86362 only.
DE 2952664 (Moriguchi et al.) 3 Jul. 1980, see Chem Ab. 94:74681 only.
DE 3319293 A1 (Oshima et al.) 1 Dec. 1983, see Chem. Ab. 100:129944 only.
JP 60061766 A2 (Ricoh Co., Ltd., Japan) 9 Apr. 1985, see Chem Ab 103:62616 only.
DD 71324 (Mertineit, Lothar et al.) 20 Feb. 1970, see Chem. Ab. 73:67757 only.

(List continued on next page.)

*Primary Examiner*—Sharon Gibson
*Assistant Examiner*—Valerie Fee
*Attorney, Agent, or Firm*—Frishauf, Holtz, Goodman, Langer & Chick, P.C.

[57] ABSTRACT

Anticorrosive compositions for use in paints comprise (i) zinc oxide with (ii) the reaction product of an acidic trivalent metal compound and a silicate or (iii) an aluminium/silicate material eg a clay.

23 Claims, No Drawings

OTHER PUBLICATIONS

CS 235851 B1 (Nedorost et al.) Jan. 3, 1987, see Chem. Ab. 108:7555 only.

Pigment Resin Technol. vol. 1 No. 1, issued 1972, Jones, R., "Extenders and Zinc Rich Paints" pp. 40–43, see Chem Ab. 76:128891 only.

Oberflaeche–Surface, vol. 4, No. 14, issued 1973, Meyer, G., "Is Progress in Residual Rust Stabilization by Coatings Possible in Principle". pp. 87–89, see Chem Ab. 79:106175 only.

Journal Oil Colour Chem. Assoc. vol. 63 No. 9, Sathyanurayana et al., "Studies on Adhesion: Effect of Part Replacement of Titanium dioxide by Zinc oxide or Extenders in . . . paints" pp. 373–378. see Chem Ab. 93:221948 only. issued 1980.

Farbe Lack, vol. 87, No. 4, 1981, Sathyanarayana et al. "Determination of the Critical Pigment . . . on the Pigment", pp. 265–269, see Chem Ab. 94:176782 only.

Sax et al., "Hawley's Condensed Chemical Dictionary", published 1987 by Van Nostrand Rheinhold Company (N.Y.), see pp. 36 and 1218.

CN 1076947 A (Xue, Zhichun) 6 Jan. 1993, see Chem Ab. 122:216728 only.

PIGMENT WHICH IS SUBSTANTIALLY FREE OF WATER-SOLUBLE SALTS AND CONFERS CORROSION RESISTANCE

This application is a continuation of application Ser. No. 08/050,768 filed Apr. 21, 1993, now abandoned, which is the continuation of application Ser. No. 07/394,585 filed Aug. 16, 1989 (abandoned), which is a Continuation-In-Part of application Ser. No. 07/287,893 filed Dec. 21, 1988 (abandoned).

This invention relates to surface treatment and more particularly to compositions for the surface treatment of metals and other materials.

Our earlier copending U.S. Patent application, Ser. No. 07/235437 filed Dec. 21st, 1987 now U.S. Pat. No. 4,881,975 describes the treatment of surfaces of metals and other materials with coating compositions which are aqueous dispersions containing acidic trivalent metal compounds e.g. phosphates and silica of fine particle size. These compositions are intended to be applied as a surface pre-treatment to deposit a corrosion-inhibiting coating before a subsequent organic coating is applied. U.S. Pat. No. 4,881,975 also describes the preparation of corrosion-inhibiting pigments obtained by reacting the acidic trivalent metal compound with a silicate in aqueous solution. The corrosion-inhibiting materials produced by this method are recovered and formulated as anticorrosive pigments for use as such in paints. Our earlier application describes an extensive range of compositions according to the prior invention and, for convenience of description of the present invention, the contents of U.S. Pat. No. 4,881,975, are to be read as incorporated in the present disclosure by reference. The compositions according to U.S. Pat. No. 4,881,975 utilized for subsequent coating with an organic layer confer excellent corrosion resistance on metal surfaces and excellent adhesion properties on metal and other surfaces.

SUMMARY OF THE INVENTION

One type of coating composition disclosed in U.S. Pat. No. 4,881,975 comprises a paint vehicle (film-forming polymer or other material) and a pre-formed material obtained by reacting, in aqueous solution, a trivalent metal compound, in which the metal is iron, aluminium, or chromium or a mixture thereof, and a silicate. In the material the silicon to trivalent metal atom ratio is in the range 0.2–30:1. A group of examples of such a composition is described in Example 13 of U.S. Pat. No. 4,881,975. Where the trivalent metal used is aluminium the pre-formed anticorrosive pigment formed by reaction of the aluminium salt with the silicate is believed to be a type of aluminium silicate material and, for convenience, the terms "metal silicate" "aluminium silicate" or "aluminium silicate material" will be used hereinafter to indicate a material of this kind although it will be understood that the chemical composition of the pigment is not precisely known. For the preparation of coating compositions for use as paint finishes i.e. containing a suitable film-forming material, anticorrosive pigments formed by the reaction of aluminium sulphate with a silicate give especially good protection and are less costly than those prepared from aluminium phosphate.

It has now been found that anticorrosive compositions, based on the aluminium or other metal silicate materials obtained by reacting the acidic trivalent metal compounds with a silicate especially those described in U.S. Pat. No. 4,881,975 mentioned above can be still further improved by the addition or incorporation of zinc oxide. Moreover, the combination of zinc oxide with the aluminium or other metal silicate material shows synergism in relation to the level of corrosion resistance conferred on treated metal surfaces.

The present invention provides an anticorrosive composition which comprises zinc oxide and a trivalent metal silicate material obtained by reacting an acidic trivalent metal compound and a silicate. The reaction is carried out in aqueous solution and the reaction product is recovered as a precipitate.

Full details of the trivalent metal silicate materials are described in our earlier application now U.S. Pat. No. 4,881,975. The preferred trivalent metals are chromium, iron and especially aluminium. The preferred acidic compounds are acid phosphates, e.g., metal tris-dihydrogen phosphates as such or mixed with extra phosphoric acid, and sulphates e.g. acid sulphates and sulphates and other salts giving an acidic reaction in aqueous solution. The trivalent metal compounds may be reacted with an alkali metal silicate in aqueous phase i.e. in solution or dispersion to produce a precipitate which, after filtration and water washing to reduce the content, of water soluble materials, is then subsequently dried at elevated temperature, e.g., at 100°–250° C. or 200°–250° C. for 0.1–6 hours, e.g., 2–6 hours. Higher drying temperatures, e.g., up to 350° C. may also be used. The product at this stage is thus a preformed product useful as a pigment for incorporation in an appropriate coating composition. The product is substantially free of the anions present in the acidic trivalent metal compound e.g. phosphate or sulphate ions, and is thus substantially free of water-soluble salts. Products prepared in this way are the highly preferred anticorrosive materials of the present invention.

Other types of aluminium silicate material for which a beneficial effect of combination with zinc oxide has been found are certain naturally occurring aluminium silicates and related materials obtained synthetically. These materials may be compounds or mixtures of oxides and/or hydroxides or other compounds of silicon, and aluminium optionally containing hydrogen bound as $H_2O$. The silicate material may also contain alkali metals, such as sodium or potassium, preferably chemically bound or alkaline earth metals such as calcium but, apart from impurities, the silicate material advantageously contains essentially only silicon, oxygen, aluminium and optionally hydrogen; most preferably the silicate material contains aluminium and hydrogen.

The invention also comprises an anticorrosive composition or pigment based on a metal silicate material optionally surface-modified by ion exchange eg with calcium or otherwise, the properties of which are improved by the addition of up to a certain amount of zinc oxide. The material to which the zinc oxide is added may be as described in U.S. Pat. No. 4,687,595 and EP46057, the disclosures of which are incorporated by reference.

DETAILED DESCRIPTION

Therefore the present invention provides an anticorrosive pigment composition which comprises zinc oxide and a trivalent metal silicate material selected from the group consisting of (i) a material obtained by reacting a trivalent metal compound with a silicate (ii) a naturally occurring aluminium silicate material or synthetic equivalent thereof, (iii) a naturally occurring or synthetic aluminium silicate surface-modified by ion exchange, and (iv) mixtures thereof.

The aluminium and other trivalent metal silicates useful for the purposes of this invention preferably contain silicon to metal in atom ratios of 0.2–30:1 eg 0.5–10:1 preferably 0.5–5:1 and especially 0.5–3:1 or 1.5–3.5:1 or 0.5–1.5:1.

A range of silicate materials may be used for the purposes of the invention including synthetic materials obtained by chemical reaction and naturally occurring aluminium silicates. The silicate materials are in the form of particles which usually have an average size of less than 10 micro meters eg. 0.1–5 micrometers especially 0.1–1 micrometers, may or may not be colloidal and may have a plate like structure; preferably they do not substantially thicken any paint or other coating composition in which they are formulated.

More preferred silicate materials are those for whose particles at least 40% pass a 2 micron screen, eg. 40–98% and especially 70–98%, and especially at least 70% pass a 1 micron screen. The silicate material is preferably one with a total water soluble content of less than 1% eg 0.05–1% such as less than 0.5% or 0.3% eg 0.02–0.5% or 0.02–0.3%; examples of ions contributing such water solubility are sodium, chloride and sulphate. Preferred silicate materials are hydrated aluminium silicates, which may be capable of acting as ion exchangers. Examples of suitable aluminium silicates are clays such as China clay (Kaolin, $Al_2O_3.2SiO_2.2H_2O$) which is particularly preferred and gives excellent performance at low cost, and bentonite $Al_2O_3.4SiO_2.2H_2O$. Mixtures of clays may be used, the clays may have been calcined but are preferably uncalcined. The particle size and water solubility characteristics given above are particularly suitable for the clays and also for the reaction products of the acidic trivalent metal compound and the silicate.

The zinc oxide and other ingredients of compositions according to this invention may be combined by any convenient method such as by mixing a water slurry of zinc oxide with the other milled solids, or by milling the dry materials together, or by water slurrying them together.

The improvement in corrosion-resisting properties obtained by the combination of zinc oxide and the aluminium silicate material is particularly noticeable with coating compositions comprising a film-forming material, as in a paint composition, and which are water-based or solvent-based. The former may be for example, aqueous emulsions or dispersions of suitable alkyd resins or vinyl polymers or vinyl-acrylic co-polymers; the latter may be alkyd resins e.g. long, medium or short oil alkyd, phenolic alkyd resins, 2-component epoxies, and chlorinated rubber, epoxy primers, epoxyester/melamine formaldehyde primers, short oil alkyd/urea formaldehyde primer, 2 pack epoxy polyamide primers, epoxy/urea formaldehyde coil coating primers and electrophoretic primers.

The incorporation of the improved pigments of the present invention into the final organic finishing composition permits the desired protective effect to be obtained with a paint or lacquer applied directly to the surface without chemical pre-treatment, that is, without any treatment other than cleaning and drying of the surface.

In comparison with known anticorrosion coating compositions, those according to the present invention show a pronounced improvement in corrosion resistance and resistance to scribe-line corrosion and blistering of the final organic coating as determined in conventional test procedures. The level of protection achieved by the composition of the invention based on zinc oxide with the trivalent metal silicate material is often superior to that obtained using either component in the absence of the other. For long term corrosion protection, the combination of the zinc oxide with the metal silicate pigment obtained from the reaction of the trivalent metal salt with the silicate appears to give better results than the combination of the clays and zinc oxide.

The relative proportions of zinc oxide and the metal silicate pigment in the compositions of this invention can be varied over a wide range. It has been found that it is usually undesirable to incorporate zinc oxide in amounts exceeding about 30% and preferably not exceeding 25% by weight of the total anticorrosive pigment in the coating composition. At higher proportions of zinc oxide the results are even more inferior. At least an effective amount of the zinc oxide is preferably used; it is preferred not to use significantly less than about 2% of zinc oxide (based on the total weight of pigment), so advantageously amounts of 2–30% or 2–25% such as 10–25% especially 15–25% are used (based on the total weight of the zinc oxide and the metal silicate component). For many purposes a convenient range of proportions of zinc oxide is from 5 to 20% for solvent-based as well as water-based formulations.

The final coating compositions for application to the metal or other surface may, contain up to 50% preferably 0.1–20% eg 1–15% such as 4–10% by weight of anticorrosive pigment based on the weight of the coating composition.

The zinc oxide incorporated as described above is desirably of particle size up to about 0.2 mm preferably from 0.001 to 0.05 or 0.1 mm. Even smaller particle sizes may be advantageous e.g. from 0.1 to 10 microns eg 0.1–1 micron especially 0.3–0.4 microns. The substrates to which the coating composition may be applied are described in our earlier application mentioned above and are usually metal surfaces. The substrates are usually first cleaned, if necessary, to remove oil, dirt and corrosion products with subsequent rinsing with water prior to coating.

The invention is illustrated in the following Examples 1–15. Examples A–E are comparative. Parts and percentages are by weight.

EXAMPLE 1

Sodium silicate ($SiO_2:Na_2O$ 2:1) (162 g) was dissolved in deionised water (1L). Aluminium dihydrogen orthophosphate solution (48% w/w) (80 ml) together with phosphoric acid (S.G. 1.75) (47 ml) was added with stirring to the sodium silicate solution. The solid was filtered off, washed well with water and dried at 230° C. for 4 hr. The solid was milled in a Retsch mill using a 0.08 mm sieve and then incorporated with 20% zinc oxide of particle size 0.34–0.38 microns, based on the total weight of pigment. The resulting solid was incorporated at 6.6% by weight into a water-based alkyd primer. After applying the paint to a clean mild steel panel to a thickness of 35 microns, the panel was stoved at 60°–160° C. for 10 minutes, allowed to age for 7 days, diagonally scribed and subjected to neutral salt spray for 200 hr. Scribe line corrosion was good with no blistering under the paint film.

EXAMPLE 2

The procedure of Example 1 was followed using 4% of the zinc oxide (instead of 20%) in the anticorrosive pigment. Excellent scribe line resistance was obtained with little blistering under the paint film.

EXAMPLE 3

The pigment was prepared from aluminium orthophosphate solution (48% w/w) (80 ml) and sodium silicate (12 g) as described in Example 13C of our prior application mentioned above. Mixing of the pigment with zinc oxide at 20% and 4% w/w in the total solid gave results comparable with those in Examples 1 and 2. The paint was prepared as described in Example 1 and applied to the panel as in Ex 1.

EXAMPLE 4

The process of Ex 3 was repeated with a pigment was prepared as in example 13E of our prior application mentioned above. Incorporation of 10% w/w of the zinc oxide (based on the total weight of pigment and zinc oxide) resulting in a coated panel with substantially reduced blistering without detrimental effect on scribe line corrosion.

EXAMPLE 5

The procedures described in Examples 1 to 4 were repeated using a solvent based air-drying phenolic/alkyd primer paint. Similar results were obtained.

Example A (Comparative)

Aluminium sulphate 16 hydrate (84 g) in water (300 ml) was added with stirring to a solution of sodium silicate ($SiO_2.Na_2O$ 2:1) (72 g) in water (800 ml) at room temperature. The slurry was filtered, washed well with water until the filtrate had a pH greater than 5 and finally dried for 4 hrs at 230° C. The product was milled in a Retsch mill using a 0.08 mm sieve.

The resulting aluminium silicate material was incorporated at 7.7% by weight into a solvent-based phenolic/alkyd primer. After applying the paint to a clean mild steel panel to a thickness of 35–40 microns the panel was allowed to age for 72 hrs, diagonally scribed and subjected to neutral salt spray for 200 hrs. Scribe line corrosion was good with some blistering under the paint film.

EXAMPLE 6

The aluminium silicate material according to Example A was mixed with 20% zinc oxide of particle size 0.34–0.38 microns based on the total weight of pigment solid (ie aluminium silicate material and zinc oxide). This solid was incorporated at 7.7% by weight in the solvent-based phenolic/alkyd primer and the same procedure carried out as in Example A. Scribe line corrosion was excellent with no blistering under the paint film.

Example B (Comparative)

The procedure of Example A was repeated using Kaolin in place of the synthetic aluminium silicate material. Light Kaolin, acid-washed, was incorporated at 7.7% by weight into the solvent-based phenolic/alkyd primer and tested as described in Example A. The results showed average scribe line corrosion with blistering under the paint film.

EXAMPLE 7

Zinc oxide was mixed with the light Kaolin of Ex. B to give a solid containing 20% by weight of the zinc oxide. This solid was incorporated at 7.7% by weight into the solvent-based phenolic/alkyd primer and the procedure of Example B was repeated. The results showed excellent scribe line corrosion with no blistering under the paint film.

Example C (Comparative)

Precipitated aluminium silicate (ex BDH, Poole, England) (with an atomic ratio of Si:Al of 7:1 and a content of 0.2% Na, 0.1% Cl and 0.5% sulphate ie 0.8% total water soluble material) was incorporated at 7.7% by weight into the solvent-based phenolic/alkyd primer and the composition was tested as described in Example A. The results showed poor scribe line corrosion with severe blistering under the paint film.

EXAMPLE 8

Zinc oxide was mixed with the precipitated aluminium silicate used in Example C to give a solid containing 20% by weight of zinc oxide. This solid was incorporated at 7.7% by weight into the solvent-based phenolic/alkyd primer and the test procedure of Example A repeated. The resulting scribe line corrosion and blistering under the paint film were better than in Example C.

EXAMPLE 9 and Comparative Ex. D.

The procedures of Example A and 6 were repeated separately with 5 different types of China clay instead of the synthetic aluminium silicate and with and without the zinc oxide (20% w/w on the total of zinc oxide and clay). The clays were obtained from English China Clays Ltd, Cornwall, England and were as follows. Clay I was Light Kaolin pharmaceutical (Brit Pharm.) grade which had been purified and acid washed to have a low heavy metal content and 0.1% total water soluble material; the particle size was such that 75% passed a 2 micron screen. Clay II was a Supreme grade of high brightness with about 0.2% total water soluble material and a particle size such that 90% passed a 1 micron screen. Clay III was a calcined grade "Polestar 200P" with about 50% of the particles passing a 2 micron screen. Clay 1V was sold under the Speswhite mark with high brightness, and a 0.2% water solubles content, and at least 60% of the particles passed a 1 micron screen, while clays V and VI were sold as Grades D and E powder with 45% of the particles less than 2 microns (for clay V) and 25% less than 2 microns (for clay VI); both clays V and VI have water soluble contents of about 0.15%. The results of the tests were as follows:

| | BLISTERING UNDER FILM | | SCRIBE LINE CORROSION | |
|---|---|---|---|---|
| CLAY | WITHOUT ZnO (Comp. Ex. D) | WITH ZnO (Ex. 9) | WITHOUT ZnO (Comp. Ex. D) | WITH ZnO (Ex. 9) |
| I | 3–4 | 0 | 2 | 0–1 |
| II | 3 | 0 | 1–2 | 0–1 |
| III | 3–4 | 1 | 2 | 1 |
| IV | 3 | 2 | 1–2 | 1 |
| V | 4 | 2 | 3 | 2 |
| VI | 4 | 2 | 3 | 2 |
| No Clay | — | 4 | — | 2 |

NOTE In the Table 0 gives the best results and 5 the worst results.

EXAMPLE 10 and Comparative Example E

The procedures of Ex. 9 and comparative Ex. D were repeated with the clays, with and without zinc oxide applied at 6.6% total weight of clay and (if present zinc oxide) in an air drying water based alkyd primer as used in Ex. 1 The results in the absence of zinc oxide were average scribe line corrosion with blistering under the paint film, whereas with zinc oxide there was improved scribe line corrosion and reduced blistering under the paint film. Clays I and II gave the best results.

EXAMPLE 11–15

The pigments of the present invention were compared with equal volumes of other pigments for corrosion inhibiting properties in commercial paint formulations. All parts are by weight.

EXAMPLE 11—Two pack epoxy-polyamide primer (green)

A two-pack composition was prepared containing in one pack a paint base of composition A in which the nature of the pigment was varied and in another pack a catalyst of composition B.

| Composition A: Materials | Quantity (parts) |
|---|---|
| EPOXY RESIN (Epikote 1001 × 75 - Shell Chemicals) | 403 |
| METYL ISO BUTYL KETONE (MIBK) | 204.1 |
| METHOXY PROPYL ACETATE (MPA - BP Chemicals) | 61.1 |
| TITANIUM DIOXIDE (Tiona 472 - SCM) | 83.6 |
| MAGNESIUM SILICATE (Micro-Talc 20/M/2 - Luzenac Talc) | 144 |
| YELLOW IRON OXIDE (Bayferrox 3920 - Bayer) | 10.5 |
| CHROMIUM OXIDE 39K3 (Blythe) | 10.4 |
| POLYETHER-MODIFIED DIMETHYL SILOXANE CO-POLYMER (Byk 300 - Byk-Chemie) | 2.52 |
| BUTANOL | 20.8 |
| XYLENE | 103.7 |
| PIGMENT - as in (i)–(v) below | |

| Composition B: Materials | Quantity (parts) |
|---|---|
| POLYAMIDE RESIN (Versamid 115 × Cray Valley Products) | 210 |
| POLYAMIDE RESIN (Versamid 140 - Cray Valley Products) | 49.1 |
| SILANE A1120 (Union Carbide) | 12.3 |
| BUTANOL | 331 |
| XYLENE | 268 |

The contents of the two packs were mixed together in a ratio of 2:1 by volume of base:catalyst to give the paint.

Five paints 11 (i)–(v) of the above composition were prepared each containing a different pigment (i)–(v) below:

| Pigment | Quantity (parts) |
|---|---|
| (I) K-White 84 (Zinc Oxide/Aluminium tripolyphosphate) | 245 |
| (II) Zinc Phosphate | 289 |
| (III) Aluminium Silicate Material as described in Example 5A | 245 |
| (IV) Shieldex AC-5 (W. R. Grace) | 158 |
| (V) Aluminium Silicate Material as described in Example 5A (196 pts) plus zinc oxide (49 pts) | 245 |

After applying each of the paints to a clean mild steel panel, to a thickness of 35 microns, the panels were air dried at room temperature for seven days, diagonally scribed and subjected to a neutral salt spray for 312 hr. The results are presented in the following Table in which 0 represents the best result and 5 the worst:

| Pigment | Scribe Line Corrosion | Blistering Under Film |
|---|---|---|
| (I) K-White 84 | 2–3 | 0 |
| (II) Zinc Phosphate | 2 | 0 |
| (IV) Shieldex AC-5 | 3 | 0 |
| (III) Aluminium Silicate Material | 1–2 | 0 |
| (V) Aluminium Silicate Material plus zinc oxide | 1 | 0 |

EXAMPLE 12 Two-pack epoxy polyamide maintenance primer

Paints 12 (i)–(v) were prepared according to the following formulation, mixing the base and catalyst in the amounts quoted.

| Material | Quantity (parts) | | | | |
|---|---|---|---|---|---|
| | (i) | (ii) | (iii) | (iv) | (v) |
| BASE | | | | | |
| EPOXY RESIN (Epikote 1001-x-75/ Shell Chemicals) | 274 | 274 | 274 | 274 | 274 |
| AMINOFORMAL- DEHYDE RESIN (Beetle BE 640-BIP) | 17.6 | 17.6 | 17.6 | 17.6 | 17.6 |
| WETTING AGENT (EFKA-63-Croxton and Garry, Agents) | 5.70 | 5.70 | 5.70 | 5.70 | 5.70 |
| MAGNESIUM SILICATE (Microtalc ATI- Norwegian Talc) | 225 | 225 | 225 | 225 | 225 |
| BARIUM SULPHATE (H. Haeffner & Co. Ltd.) | 328 | 328 | 328 | 328 | 328 |
| TITANIUM DIOXIDE RCR 2 (Tioxide UK) | 253 | 253 | 253 | 253 | 253 |
| XYLENE:BUTANOL (1:1) (BP Chemicals) | 303 | 303 | 303 | 303 | 303 |
| K-WHITE 84 | 65.0 | 0 | 0 | 0 | 0 |
| ZINC PHOSPHATE | 0 | 76.5 | 0 | 0 | 0 |
| ALUMINIUM SILICATE MATERIAL (as in ex. 11) | 0 | 0 | 65.0 | 0 | 0 |
| SHIELDEX AC-5 (W. R. Grace) | 0 | 0 | 0 | 44.1 | 0 |
| ALUMINIUM SILICATE MATERIAL (52 pts.) PLUS ZINC OXIDE (13 pts.) | 0 | 0 | 0 | 0 | 65.0 |
| CATALYST | | | | | |
| Versamid 115 (Cray Valley Products) in Xylene/Butanol (1:1) (65% Solution) | 148 | 148 | 148 | 148 | 148 |

The paints were applied to mild steel panels, cured and tested in the same way as the paints of Example 11, except that neutral salt spray was applied for 240 hrs. The results are present below where 0 represents the best result and 5 the worst:

| Pigment | Scribe-Line Corrosion | Blistering Under Film |
|---|---|---|
| (I) K-White 84 | 2 | 1 |
| (II) Zinc Phosphate | 4 | 2 |
| (IV) Shieldex AC-5 | 2 | 1 |
| (III) Aluminium Silicate Material | 2–3 | 2 |

-continued

| Pigment | Scribe-Line Corrosion | Blistering Under Film |
|---|---|---|
| (V) Aluminium Silicate Material plus zinc oxide | 2 | 1 |

EXAMPLE 13—Short oil alkyd/urea formaldehyde industrial primer (yellow) Two-pack compositions were formulated as follows:

PACK A:

| | Quantity (parts) Paint 13: | | | | |
|---|---|---|---|---|---|
| Material | (i) | (ii) | (iii) | (iv) | (v) |
| SHORT OIL ALKYD (Synolac 9090X Cray Valley Prod. Ltd) | 369 | 369 | 369 | 369 | 369 |
| ORGANIC SOLVENT (Solvesso 100 - Esso Chemicals) | 136 | 136 | 136 | 136 | 136 |
| POLYOXYALKYL- ENEMETHYLALKYL POLYSILOXANE CO-POLYMER (Byk 320 - Byk-Chemie) | 1.83 | 1.83 | 1.83 | 1.83 | 1.83 |
| BARIUM SULPHATE (Micronised Barytes- H. Haeffner) | 111 | 111 | 111 | 111 | 111 |
| MAGNESIUM SILICATE (Micro-Talc 10/M/2- Luzenac Talc) | 76.6 | 76.6 | 76.6 | 76.6 | 76.6 |
| YELLOW IRON OXIDE (Bayferrox 3920-Bayer) | 59.8 | 59.8 | 59.8 | 59.8 | 59.8 |
| TITANIUM DIOXIDE (Tioxide RCR 2-Tioxide) | 15.9 | 15.9 | 15.9 | 15.9 | 15.9 |
| ORGANIC DERIVATIVE OF A MONTMORILLONITE CLAY (Bentone SD 2-NL Chemicals) | 2.96 | 2.96 | 2.96 | 2.96 | 2.96 |
| XYLENE | 38.5 | 38.5 | 38.5 | 38.5 | 38.5 |
| BUTANOL | 79.5 | 79.5 | 79.5 | 79.5 | 79.5 |
| K-WHITE 84 | 162 | 0 | 0 | 0 | 0 |
| ZINC PHOSPHATE | 0 | 190 | 0 | 0 | 0 |
| ALUMINIUM SILICATE MATERIAL (as in Ex. 11) | 0 | 0 | 162 | 0 | 0 |
| SHIELDEX AC-5 (W. R. Grace) | 0 | 0 | 0 | 104 | 0 |
| ALUMINIUM SILICATE MATERIAL (as in Example 11, 32 parts) PLUS ZINC OXIDE (32 parts) | 0 | 0 | 0 | 0 | 162 |

PACK B:

| Material | Quantity (parts) - in each paint 13 (i)–(v) |
|---|---|
| UNPLASTICISED UREA RESIN (Resamine HF Hoechst/RCL) | 15.3 |
| SOLVESSO 100 (Esso Chemicals) | 25.7 |
| BUTANOL | 21.4 |

The contents of packs A and B were mixed together to give the paints 13 (i)–(v). After applying each paint to a clean mild steel panel to a thickness of 35 microns, the panels were cured for 30 minutes at a temperature of 150° C., diagonally scribed and subjected to a neutral salt spray for 192 hrs. The results are presented in the following table in which 0 represents the best result and 5 the worst:

| Pigment | Scribe-Line Corrosion | Blistering Under Film |
|---|---|---|
| (I) K-White 84 | difficult to assess | 5 |
| (II) Zinc Phosphate | 1–2 | 0 |
| (IV) Shieldex AC-5 | 1–2 | 0 |
| (III) Aluminium Silicate Material | 2 | 0 |
| (V) Aluminium Silicate Material plus zinc oxide | 1 | 0 |

EXAMPLE 14—Epoxy - ester/melamine - formaldehyde industrial primer.

Paints 14 (i)–(v) were prepared by mixing the materials below and then adding unplasticised melamine formaldehyde resin (Maprenal 580 Hoechst/RCL) (209 pts.) and Solvesso 100 (Esso Chemicals) (24.7 pts.).

| | Quantity (parts) Paint 14: | | | | |
|---|---|---|---|---|---|
| Material | (i) | (ii) | (iii) | (iv) | (v) |
| SHORT OIL OXIDISING EPOXY ESTER (Synolac 463- Cray Valley Prod. Ltd) | 446 | 446 | 446 | 446 | 446 |
| ORGANIC SOLVENT (Solvesso 100 - Esso Chemicals) | 103 | 103 | 103 | 103 | 103 |
| POLYOXYALKYL- ENEMETHYLALKYL POLYSILOXANE CO-POLYMER (Byk 320 - Byk-Chemie) | 2.50 | 2.50 | 2.50 | 2.50 | 2.50 |
| BARIUM SULPHATE (Micronised Barytes- H. Haeffner) | 97.5 | 97.5 | 97.5 | 97.5 | 97.5 |
| MAGNESIUM SILICATE (Micro-Talc 20/M/2- Luzenac Talc) | 69.7 | 69.7 | 69.7 | 69.7 | 69.7 |
| TITANIUM DIOXIDE (Tioxide RCR 2-Tioxide) | 21.7 | 21.7 | 21.7 | 21.7 | 21.7 |
| ORGANIC DERIVATIVE OF A MONTMORILLONITE CLAY (Bentone SD 2-NL Chemicals) | 4.04 | 4.04 | 4.04 | 4.04 | 4.04 |
| RED OXIDE 130 M (Bayer) | 95.6 | 95.6 | 95.6 | 95.6 | 95.6 |
| XYLENE | 12.9 | 12.9 | 12.9 | 12.9 | 12.9 |
| BUTANOL | 12.5 | 12.5 | 12.5 | 12.5 | 12.5 |
| K-WHITE 84 | 209 | 0 | 0 | 0 | 0 |
| ZINC PHOSPHATE | 0 | 246 | 0 | 0 | 0 |
| ALUMINUM SILICATE MATERIAL (as in Ex. 11) | 0 | 0 | 209 | 0 | 0 |
| SHIELDEX AC-5 (W. R. Grace) | 0 | 0 | 0 | 134 | 0 |
| ALUMINIUM SILICATE MATERIAL (as in Example 11, 167 parts) PLUS ZINC OXIDE (42 parts) | 0 | 0 | 0 | 0 | 209 |

After applying each paint to a clean mild steel panel to a thickness of 35 microns, the panels were cured for 30 minutes at 150° C., diagonally scribed and subjected to a neutral salt spray for 300 hr. The results are presented below in which 0 represents the best results and 5 the worst:

| Pigment | Scribe-Line Corrosion | Blistering Under Film |
|---|---|---|
| (I) K-White 84 | 2 | 1–2 |
| (II) Zinc Phosphate | 2 | 2–3 |
| (IV) Shieldex AC-5 | 1–2 | 0–1 |
| (III) Aluminium Silicate Material | 2 | 2 |
| (V) Aluminium Silicate Material plus zinc oxide | 1 | 1 |

EXAMPLE 15—Water-based maintenance primer

A two-pack composition was prepared and the contents mixed together to form paints 15 (i)–(v)

PACK 1:

| Material | Quantity (parts) Paint 15: | | | | |
|---|---|---|---|---|---|
| | (i) | (ii) | (iii) | (iv) | (v) |
| WATER | 8.9 | 8.9 | 8.9 | 8.9 | 8.9 |
| METHYL CARBITOL | 12.5 | 12.5 | 12.5 | 12.5 | 12.5 |
| DISPERSANT (Tamol 165) | 2.1 | 2.1 | 2.1 | 2.1 | 2.1 |
| WETTING AGENT (Triton CF-10) | 0.75 | 0.75 | 0.75 | 0.75 | 0.75 |
| FOAM CONTROL AGENT (Drewplus TS - 4380) | 0.75 | 0.75 | 0.75 | 0.75 | 0.75 |
| RHEOLOGY MODIFIER (Acrysol RM 825) | 1.5 | 1.5 | 1.5 | 1.5 | 1.5 |
| RED IRON OXIDE (Bayferrox 120NM) | 13.9 | 13.9 | 13.9 | 13.9 | 13.9 |
| CALCIUM CARBONATE (Atomite) | 37.5 | 37.5 | 37.5 | 37.5 | 37.5 |
| K-WHITE 105 | 6.1 | 0 | 0 | 0 | 0 |
| ZINC PHOSPHATE | 0 | 6.9 | 0 | 0 | 0 |
| SHIELDEX AC-3 | 0 | 0 | 0 | 4.5 | 0 |
| ALUMINUM SILICATE MATERIAL (as in Ex. 11) | 0 | 0 | 6.1 | 0 | 0 |
| ALUMINIUM SILICATE MATERIAL (as in example 11 - 4.9 parts) PLUS ZINC OXIDE (1.2 pts.) | 0 | 0 | 0 | 0 | 6.1 |

PACK 2:

| Material | Quantity (parts) - for each paints 15 (i)–(v) |
|---|---|
| AQUEOUS POLYURETHANE DISPERSION (Maincote HG - 54) | 147.9 |
| SOLVENT (Texanol) | 3.75 |
| FOAM CONTROL AGENT (Drewplus 4310) | 0.75 |
| AMMONIUM HYDROXIDE (NH$_4$OH - 28% NH$_3$) | 1.0 |
| BUTYL CARBITOL | 8.1 |
| DIBUTYL PHTHALATE | 3.75 |
| SODIUM NITRITE (15%) | 2.0 |

After applying each paint to a mild steel panel to a thickness of 35 microns, the panels were air dried at room temperature for seven days, diagonally scribed and subjected to a neutral salt spray for 240 hr. The results are presented in the following table in which 0 represents the best result and 5 the worst:

| Pigment | Scribe Line Corrosion | Blistering Under Film |
|---|---|---|
| (I) K-White 105 | 3 | 1–2 |
| (II) Zinc Phosphate | 0–1 | 0 |
| (IV) Shieldex AC-3 | 2–3 | 2 |
| (III) Aluminium Silicate Material | 0–1 | 2 |
| (V) Aluminium Silicate Material plus zinc oxide | 0–1 | 0 |

We claim:

1. A pigment which is substantially free of water-soluble salts and which confers corrosion resistance consisting essentially of a mixture of (a) a trivalent metal silicate material selected from the group consisting of (i) a synthetic trivalent iron, aluminum or chromium silicate, (ii) a naturally occurring aluminosilicate clay material and (iii) mixtures thereof, and (b) an effective amount up to 30% by weight zinc oxide based on the total weight of said zinc oxide and said metal silicate material; said zinc oxide being in particulate form and said metal silicate being in the major proportion by weight of the pigment.

2. A pigment according to claim 1, wherein the trivalent metal is aluminium.

3. A pigment according to claim 2, wherein the metal silicate material is a reaction product prepared in aqueous solution from an aluminium salt selected from an acid phosphate, a sulphate or mixture thereof and a soluble silicate.

4. A pigment according to claim 1, in which the metal silicate material is a hydrated aluminium silicate clay.

5. A pigment according to claim 4, in which the metal silicate material is china clay.

6. A pigment according to any one of claims 1, 2, 3 or 4, wherein the zinc oxide comprises 2–30% by weight of the total weight of said zinc oxide and said metal silicate material.

7. A pigment according to claim 6, wherein the zinc oxide comprises 2–25% by weight of the total weight of said zinc oxide and said metal silicate material.

8. A pigment according to claim 6, wherein the zinc oxide comprises 10–25% by weight of the total weight of said zinc oxide and said metal silicate material.

9. A pigment according to claim 6, wherein the zinc oxide comprises 5–25% by weight of the total weight of said zinc oxide and said metal silicate material.

10. A pigment according to claim 1, wherein the zinc oxide has a particle size of 0.1–10 microns.

11. A pigment according to claim 1, in which the silicon to trivalent metal atom ratio is 0.2–30:1.

12. A pigment according to claim 1, in which the silicon to trivalent metal atom ratio is 0.5–10:1.

13. A pigment according to claim 1, in which the silicon to trivalent metal atom ratio is 0.5–5:1.

14. A pigment according to claim 1, in which the silicon to trivalent metal atom ratio is 0.5–3:1.

15. A coating composition which comprising a film forming material and a pigment according to claim 1.

16. A coating composition according to claim 15 wherein the film forming material is an alkyd primer.

17. A coating composition according to claim 15, which is water based.

18. A coating composition according to claim 15, which is organic solvent based.

19. A process for conferring corrosion resistance to a surface which comprises applying to the metal surface a composition according to claim 15.

20. A pigment according to claim 1, wherein the synthetic trivalent iron, aluminum, or chromium silicate is obtained by reacting a trivalent iron, aluminum, or chromium salt with a silicate in an aqueous solution.

21. A pigment which is substantially free of water-soluble salts and which confers corrosion resistance, consisting essentially of a mixture of (a) a material obtained by (i) reacting an aluminum salt and a silicate in an aqueous solution to obtain an aluminum silicate reaction product and then (ii) separating and (iii) drying the aluminum silicate reaction product, and (b) an effective amount up to 30% by weight zinc oxide based on the total weight of said zinc oxide and said metal silicate material; said zinc oxide in particular form, said material (a) being in the major proportion by weight of the pigment.

22. A salt-free pigment according to claim 21, in which the aluminium salt is a phosphate or sulphate.

23. A pigment according to claim 21 wherein the zinc oxide comprises 2–30% by weight of the total weight of said aluminum silicate reaction product and said zinc oxide.

\* \* \* \* \*